M. SEGEL.
PROJECTING MACHINE.
APPLICATION FILED JUNE 2, 1913.

1,318,016.

Patented Oct. 7, 1919.
4 SHEETS—SHEET 1.

WITNESSES:
Mabel Dittenhoefer
Robert Richter

INVENTOR.
Michael Segel
BY
F. Warren Wright
ATTORNEYS.

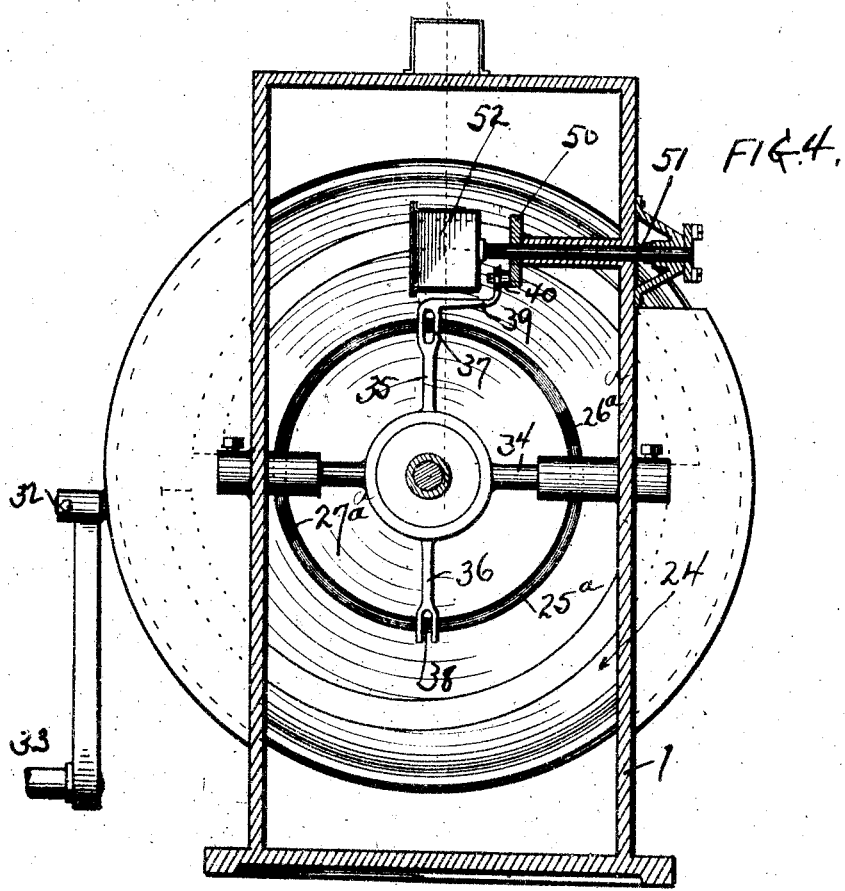

UNITED STATES PATENT OFFICE.

MICHAEL SEGEL, OF NEW YORK, N. Y.

PROJECTING-MACHINE.

1,318,016.　　　Specification of Letters Patent.　　Patented Oct. 7, 1919.

Application filed June 2, 1913. Serial No. 771,147.

*To all whom it may concern:*

Be it known that I, MICHAEL SEGEL, a citizen of the United States, residing at New York city, in the county and State of New York, have invented certain new and useful Improvements in Projecting-Machines, of which the following is a clear, full, and exact description.

This invention relates to a projecting machine for moving pictures.

The object of the invention is to produce a machine by the use of diffractors, which will, with a continuous moving film, correctly focus the picture at all times upon a screen.

The invention consists, as shown in the special embodiment illustrated by the drawings in this case, of means for moving a picture film continuously across the light rays from an arc lamp or other light emitting source, and providing for such picture a moving plate having eccentric slots through its surface and moving with a definite relation to the movement of the film, so that as the film moves downwardly the slot will also have moved eccentrically to always keep said picture framed in the slot between for its two horizontal lines, and upon the complete passage of the picture out of the line of projection the next succeeding picture will come under the influence of a second eccentric slot, whereby the projecting of the second picture will follow the first, and so on.

In order to have the light rays properly follow the moving film, I prefer to provide a diffractor for directing the concentrated rays of light from the arc, and causing them to travel through the diffractor with a change of direction of such extent as to follow the moving picture in its travel which is to keep good light and perfect focus as well as conserving the light. At the completion of the travel of one picture automatic means are provided for changing such light diffractor to operate upon the next picture in its new position. The rays of light which pass through the picture, and through the lens, must also be corrected with relation to the screen, so as to always pass through the lens in the same position, and a second important feature is that the distance between the picture and the lens must be maintained the same for the light rays, or any deviation due to the use of diffractors, must be compensated. To accomplish this purpose between the picture and the lens, I provide twin diffractors, both operatively connected, and moving in unison with the light diffractors before-mentioned, and the eccentric slots and film. One of these diffractors is adapted to act in connection with the moving picture, so that all the light which passes therethrough will be changed in direction, so that upon the screen there will be the appearance of a stationary picture, although the film is moving. The first diffractor is similarly actuated, and for the purpose of this case, I will call it the "compensating diffractor." It is so connected with its twin diffractor, that at all times they will occupy an angle with relation to each other such that the diffraction of the rays by one will be corrected by the other, as to the distance between the picture and the lens, so that perfect focus may be maintained in this type of apparatus, which has heretofore been impossible.

Furthermore in carrying out the invention as above set forth I operate the slotted plate, the diffractors, the film, all from a common shaft. The common shaft through a sprocket tends to move the picture film through the machine, to rotate by gearing the plate with the slots, which is mounted on the shaft itself. A cam is carried by the plate for operating mechanisms for operating the diffractors.

The scope of my invention will be pointed out in the claims.

In the drawings:

Fig. 4 is a sectional view of the machine on the line 4—4 Fig. 3.

Figure 1:
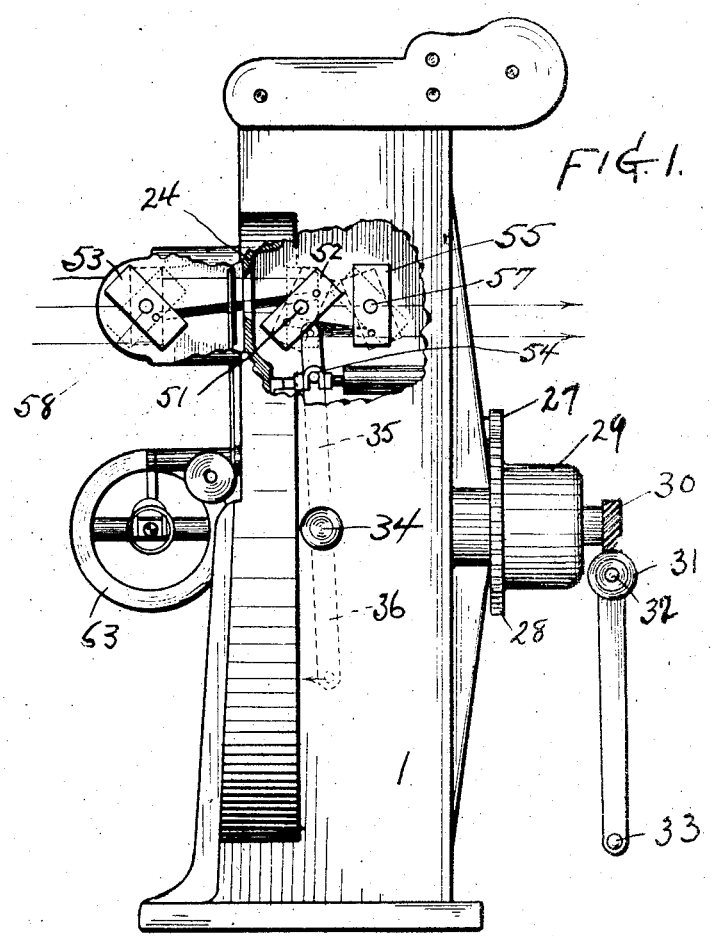
Figure 1 is a side elevation of my improved machine with the casing partly broken away to show the diffractors.
Figure 2:
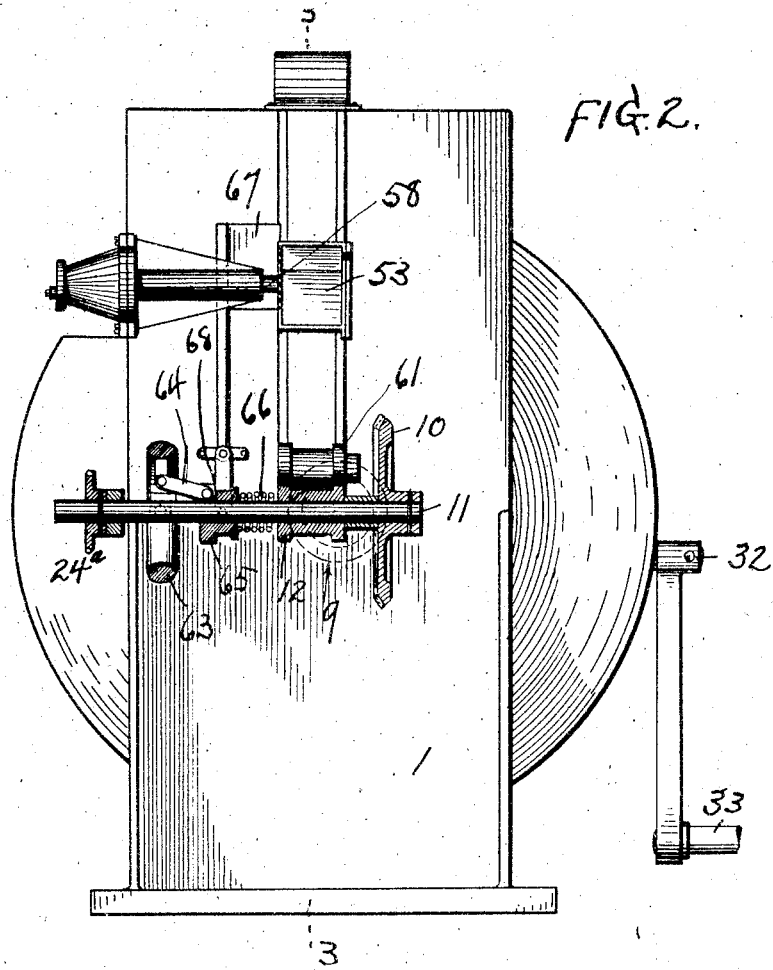
Fig. 2 is a rear view of my machine, part being shown in section on a vertical section line 2—2 Fig. 3.
Figure 3:
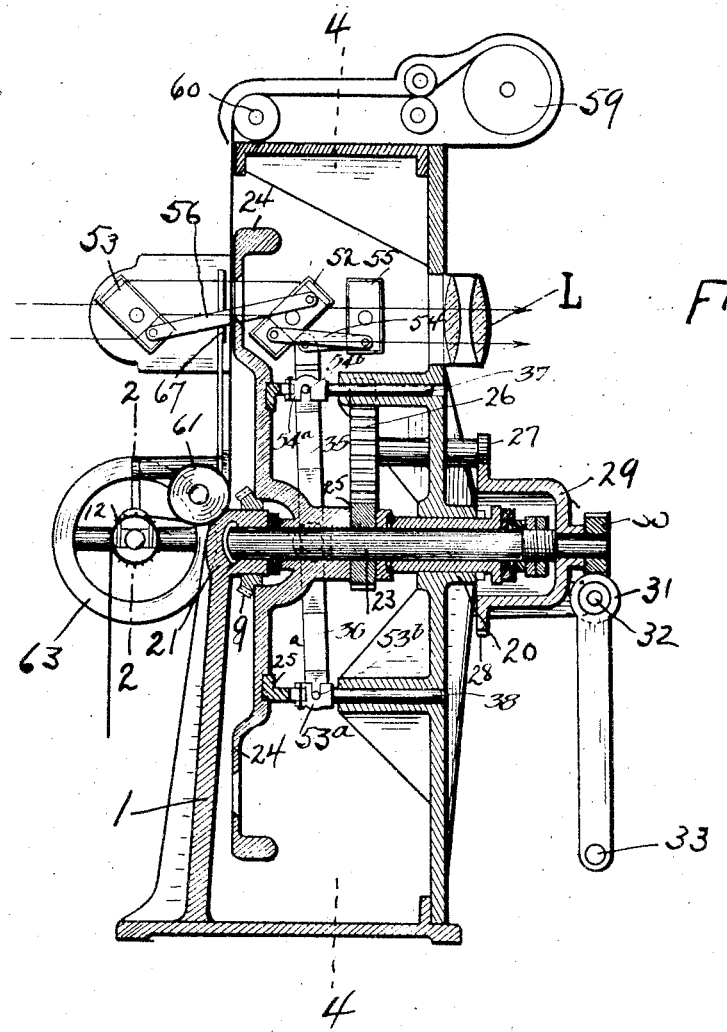
Fig. 3 is a central vertical section of the machine on line 3—3, Fig. 2.

As shown in the drawings: 1 is the frame provided with an aperture for the lens L, shown diagrammatically in the picture. The frame is also provided with bearings 20 and 21 for a shaft 23, which shaft carries a beveled gear 9 meshing with a beveled gear 10 on a shaft 11, on which the sprocket reel 12 is mounted, so that upon the rotation of the shaft the sprocket reel will be continuously operated. On the shaft 23 a plate 24 with concentric openings is mounted, secured to a pinion 25, in mesh with the pinion 26 driven by a pinion 27, which is engaged by gear teeth 28 on a flange of the hood 29, which is also driven by the same mechanism which drives the shaft 23. The mechanism may comprise a diagonal tooth gear 30 in mesh with a similar gear 31 on a crank shaft 32, and provided with the usual crank handle 33. The plate 24 carries a cam 25$^a$ having two high places 26$^a$—27$^a$ as shown on Fig. 4. The cam serves to operate a vertical lever on a free shaft 34 (see Fig. 4), which has an upstanding arm 35, and a downwardly projecting arm 36. In each arm is a rod 37 and 38 having at one end lugs 53$^a$ and 54$^a$ and a slot in the lugs engaging a pin 53$^b$ and 54$^b$ and an upwardly extending arm 39 secured to a stud 40 on a plate 50 secured to the shaft 51 of the diffractor 52. The rods 37 and 38 slide in suitable bearings of the frame 1. These rods 37 and 38 are pushed back and forth by the cam 26. The pins 54$^b$ and 53$^b$ connect the levers 35 and 36 with the rods 37 and 38 operatively so that the rotation of the cam 26 will cause an oscillation of the levers every time when the shutter space is in the focal line to restore all the diffractors to original projecting position. The three diffractors are connected, 55 with 52, by a link 54, 52 connected to 53 by a link 56. The link 56 is pivoted to the diffractor 53 at a point nearer to its axis of rotation than is the case with diffractor 52. This is for the purpose of gaining with this diffractor 53 the same amount of diffraction as is obtained by the use of the two diffractors 52 and 55. Therefore, diffractor 53 must be moved twice the angle of the diffractors 52 and 55. These links as shown in Fig. 4 are connected on the outside of the machine, each diffractor having its independent shaft 51, 57 and 58. The picture is taken from a reel 59 over an idler reel 60, around an idler reel 61 and to the film-advancing reel 12. On the shaft 11 of the film-advancing reel I may pivot a governor wheel 63 secured by a link 64 to a collar 65 the cam having a groove engaging a pin which is fastened to the link 68 normally held against the tension of a spring 66, in the position of Fig. 2, when the device is operating. A light shutter 67 is attached to the collar 65 by means of a link 68, so that upon a stoppage of the machine, the centrifugal force of the governor 63, no longer being effective, the spring will shift the governor wheel counter-clockwise about its pivot, and likewise move the collar, and cause the shutter 67 to shut off light from the screen, but upon the rotation of the handle the governor, due to centrifugal force, will right itself and keep the aperture open.

The operation of this device will be obvious to any one skilled in the art in view of the description thereof, in the fore part of this specification.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. In a motion picture apparatus, a source of light, a lens, means for continuously moving a film past the light rays projected by said source of light, a plurality of rectangularly shaped diffractors located between the picture and the lens, and means for moving said diffractors automatically into initial position after the passage of one picture out of the focal line, and upon the insertion of the succeeding picture therein, and a rectangular diffractor located between the film and the light source, and means to operate said last mentioned diffractor so as to direct the rays of light to travel in unison with the film during the time of projection thereof.

2. In a motion picture apparatus having a source of light and a condenser lens adjacent thereto for projecting the light rays onto a continuously running picture film exhibited through projecting prisms and a projecting lens, in combination with rectangularly shaped prisms, means for operating said prisms to keep the projected picture optically stationary on the screen, of a diffracting rectangularly shaped prism mounted in said path of light between said film and light source, and operating means for said diffracting prism connecting same with said film and said projecting prisms to cause same to operate coincidently therewith substantially as and for the purpose described.

3. In a motion picture apparatus, a continuously moving film, operating means therefor, a source of light, a projecting lens, a plurality of pivotally mounted rectangularly shaped diffracting prisms in the optical axis thereof, operating means for the diffractors connected with the film operating means, said diffractor operating means adapted to rock the prisms to keep the projected picture optically stationary on the screen substantially as shown and described.

Signed at New York city, in the county and State of New York, this 26th day of May, in the year one thousand nine hundred and thirteen.

MICHAEL SEGEL.

Witnesses:
ANTON MEHLFELDER,
E. C. DUFF.